June 4, 1940.  D. H. COX  2,202,837
COT FASTENER
Filed July 12, 1937
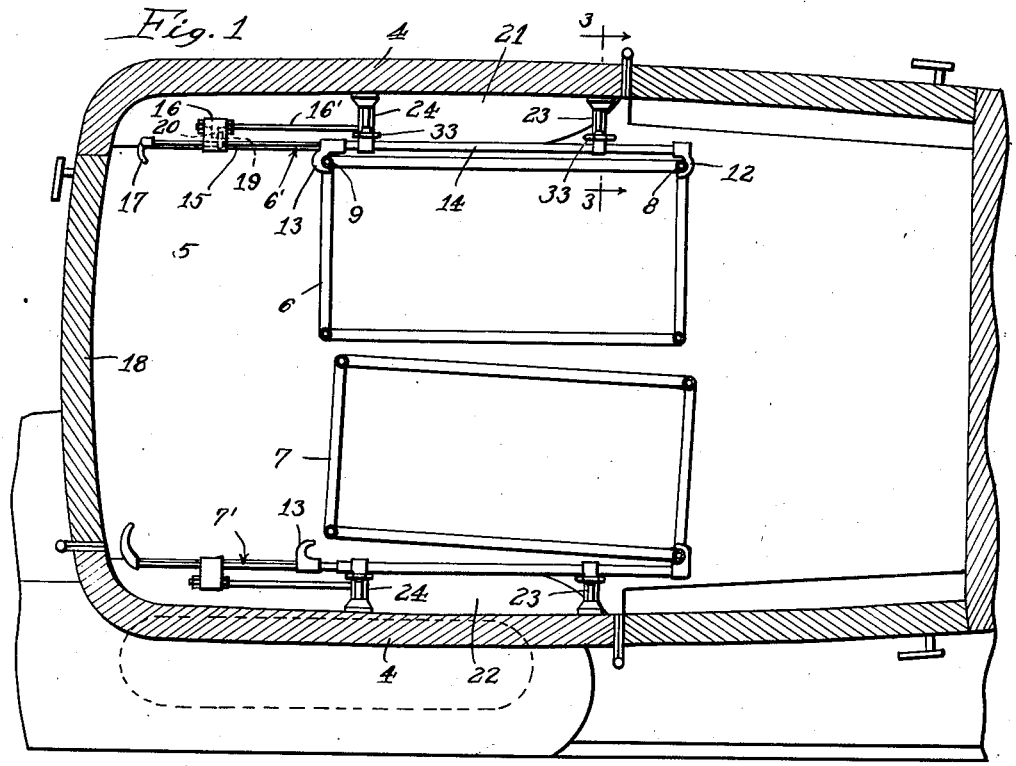
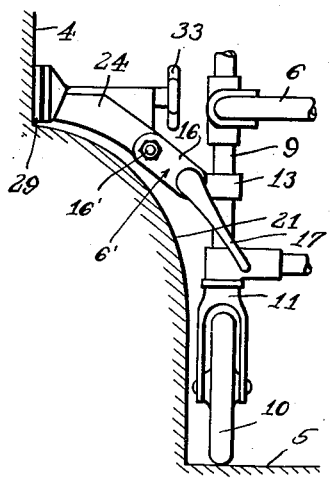
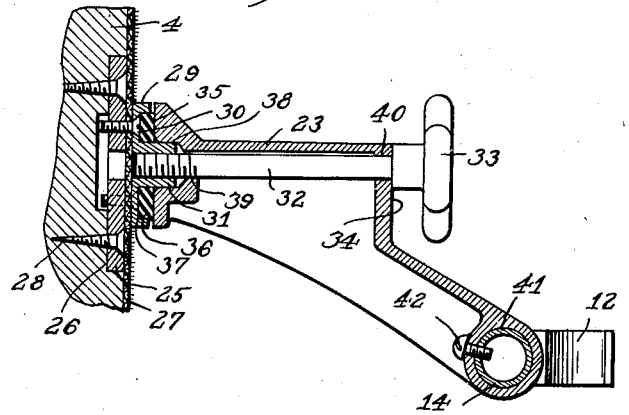
Inventor:
Donald H. Cox Patented June 4, 1940

2,202,837

UNITED STATES PATENT OFFICE 2,202,837

COT FASTENER

Donald H. Cox, Freeport, Ill., assignor to Henney Motor Company, Freeport, Ill., a corporation of Delaware Application July 12, 1937, Serial No. 153,111

3 Claims. (Cl. 296—19)

This invention relates to cot fasteners for use in ambulances and other vehicles.

Van Deest Patent 1,858,530 illustrates a cot fastener of the general type in connection with which the improvements of my invention are intended to be used. In ambulances and hearses convertible to use as ambulances, the wheel housings project inwardly on opposite sides so far that if the conventional type cot fastener were mounted thereon or on standards attached to the floor next to these housings and a standard width of cot were used, there would not be sufficient room for more than just one cot; it would be impossible to place two cots in the vehicle side by side, due to the amount of space wasted next to the wheel housings by the cot fasteners. It is therefore the principal object of my invention to provide an improved cot fastener mounting consisting of heavy sturdy brackets constructed for attachment directly to the side walls of the vehicle above and extending outwardly over the wheel housings and supporting the cot fasteners in such positions that the cots stand immediately alongside the wheel housings, thereby saving enough floor space so that two cots can be accommodated easily.

Another important object of the invention consists in the provision of concealed anchor plates in the walls that serve as supports for exposed anchor plates on which the cot fastener brackets are arranged to be detachably secured, thus permitting an undertaker to convert a hearse into an ambulance by merely applying the exposed anchor plates and fastening the cot fastener brackets thereto. In this connection, a feature worthy of note is the use of rubber cushioning means set in recesses on the exposed anchor plates for silencing the engagement of the brackets therewith and at the same time providing a yielding element in the detachable connections to act similarly as spring lock washers and minimize the danger of the fastening bolts loosening, the latter being equipped with large heads to permit tightening thereof satisfactorily by hand.

The invention is illustrated in the accompanying drawing, in which—

Figure 1 is a horizontal section through a portion of a hearse and/or ambulance equipped with cot fasteners mounted in accordance with my invention;

Fig. 2 is a rear view of one of the cot fasteners, and

Fig. 3 is a cross section on the line 3—3 of Fig. 1 on an enlarged scale.

The same reference numerals are applied to corresponding parts throughout the views.

The numerals 4 and 5 designate the side walls and floor, respectively, of a hearse and/or ambulance in which the cots 6 and 7 are arranged to be fastened in place by cot fasteners 6' and 7', respectively. Now, the cots may be of any suitable or preferred construction, those shown being of the conventional form providing front and rear legs 8 and 9, respectively, by means of which the same may be held in the cot fasteners. As usual, wheels 10 are provided on the cots to permit them to be rolled into and out of position on the floor 5, and these wheels are carried on casters 11 so as to permit sidewise movement at will. The cot fasteners 6' and 7' resemble that shown in Van Deest Patent 1,858,530 in that each has two hooks, a front hook 12 to engage the front leg 8 and a rear hook 13 to engage the rear leg 9. However, whereas the cot fastener in the Van Deest patent discloses the front hook secured to the wall and the rear hook slidable on a separate base secured to the wall, each of the fasteners 6' and 7' comprises a tubular body 14 extending longitudinally with respect to the cot associated therewith and having the front hook 12 rigidly mounted thereon and the rear hook 13 slidable lengthwise with respect thereto against the action of spring means (not shown), the latter tending normally to urge the hook 13 toward the hook 12 to grip the legs of the cot therebetween. A rod 15 attached to the hook 13 to swivel with respect thereto is slidable endwise in an intermediate bearing 16 and has a handle 17 on the rear end conveniently accessible from behind the vehicle when the rear door 18 is open, whereby to permit manual unlocking and withdrawal of the rear hook 13 of either fastener from locking engagement with the associated cot. The bearing 16 is supported on the rear end of a rod 16' suitably secured to the rear one of two cot fastener supporting brackets (24). A lug 19 on the rod 15 cooperates with a lug 20 on the bearing 16 to hold the hook 13 releasably locked in either the cot holding position of the hook 13 engaging the cot 6, or the retracted position of the hook 13 related to the cot 7. In keeping with the disclosure of the Van Deest patent, the lug 19 is engageable either in front or behind the lug 20 by simply turning the rod 15 by means of the handle 17 to disengage the lug 19 from lug 20, and then moving the rod 15 endwise enough to bring the lug 19 on the other side of the lug 20, whereupon it can be engaged on that side by again turning the rod 15 with the handle 17. Of course, since the hooks 13 are spring actuated toward locked position, the retracting movement is against the action of the spring means while the locking movement is aided by the spring means, and, as a matter of fact, the cots would be held securely enough by the spring actuated hooks 13 even if the lugs 19 were not engaged with the lugs 20, but the engagement of the lugs 19 with the lugs 20 eliminates any danger of the cots becoming accidentally disengaged from the the cot fasteners.

Attention is now called to the rear wheel housings 21 and 22 which project inwardly on opposite sides of the vehicle to such an extent that if the cot fasteners 6' and 7' were mounted on these housings, or on standards attached to the floor next to the housings, there would not be sufficient floor space left to permit placing more than one cot in the vehicle at a time. Of course, this would be a serious handicap, because, in the majority of traffic accidents serious enough to necessitate calling an ambulance, there is invariably more than one person injured who must be rushed to the hospital. Hence it is considered imperative that there be facilities for carrying two cots at a time, and moreover that these cots be fastened in place securely and still with facility for quick release and removal of either cot with the other in position. The brackets 23 and 24 provided in connection with each cot fastener in accordance with my invention provide a firm support for the cot fasteners directly over the wheel housings in the space that would otherwise be wasted, thereby permitting the cots to be rolled into place immediately alongside the wheel housings and accordingly conserving floor space so that two standard width cots can be carried easily side by side and maneuvered into and out of the vehicle without difficulty delay. These brackets are moreover so designed that they can be removed and replaced readily so that a hearse can be quickly and easily converted into an ambulance, and when the cot fasteners are subsequently removed again, there is not enough left on the side walls to give much evidence of the convertibility feature. Thus, an undertaking establishment in a small town whose business would not warrant having a separate ambulance can equip their one vehicle for use interchangeably as an ambulance or hearse.

Referring more particularly to Figs. 2 and 3, Fig. 2 shows how the brackets 23 and 24 support the cot fastener 6' substantially entirely over the rear wheel housing 21, permitting the cot 6 to be placed immediately next to the wheel housing. Fig. 3 shows how the brackets are detachably secured to the side walls 4. A concealed anchor plate 25 is set in a recess 26 in the wall under the upholstering or wall covering 27 and fastened as by means of screws 28. These plates are provided by the hearse manufacturer as an item of standard equipment, in accordance with this invention, and their presence will not necessarily be known to the purchaser unless he is informed at the time of purchase that the hearse may be converted into an ambulance by the fastening of the brackets 23 and 24 to the side walls to support cot fasteners thereon. At any rate, the exposed anchor plates 29 can be attached to the concealed anchor plates at any time by simply puncturing the upholstering to pass the screws 30 therethrough from the plates 29 into tapped holes in the plates 25. There is a central hollow cylindrical boss 31 on the plate 29 internally threaded to receive the threaded end of a hand-screw 32 for clamping the bracket 23 or 24, as the case may be, to the plate 29. The hand-screw 32 has an enlarged head or handle portion 33 on the outer end thereof which comes into abutment with a flat surface 34 on the bracket as the bolt is threaded home. A flat surface 35 on the opposite side of the bracket faces the anchor plate 29 and has abutment with a rubber ring 36 set in a recess 37 in the anchor plate concentric with the boss 31. This cushion piece projects from the anchor plate sufficiently in its uncompressed state so that it will be compressed by the bracket as the hand-screw 32 is tightened. A counter bore 38 in the bracket receives the boss 31 as a pilot, thereby centering the bracket with respect to the anchor plate and supporting it while the bolt is being entered and threaded in place. The counter-bore 38 is concentric with holes 39 and 40 in the back and front walls of the bracket through which the hand-screw 32 is entered. A transverse bore 41 in the outer end of each of the brackets 23 and 24 receives the rod 14, previously mentioned, that carries the cot-clamping hooks 12 and 13. Screws 42 threaded in the brackets from the inner side, as shown in Fig. 3, into holes in the rod 14 serve to secure the latter rigidly in proper operative relation to the brackets with the hooks 12 and 13 extending horizontally, that is, substantially at right angles to the planes of the side walls 4.

In operation, it will be seen that it is a simple job to remove and replace the cot fasteners, and one man can easily do it. In removing a cot fastener, the handle-shaped heads 33 are turned to retract the hand-screws 32, the brackets 23 and 24 being supported by the bosses 31 sufficiently during this operation. Then the cot fastener can be grasped by the rod 14 and pulled outwardly so as to slide both brackets 23 and 24 off the bosses 31, whereupon the cot fastener can be carried away and set aside until it is to be used again. In attaching the cot fasteners, the brackets are simply slipped over the piloting bosses 31 and then the hand-screws 32 are entered and tightened. Here again it is a job that one man can easily take care of. Once the hand-screws are tightened, compressing the rubber seats 36, there is no possibility of rattling nor any likelihood of the hand-screws working loose, because each compressed rubber acts the same as a spring lock washer. The broad seating of the brackets on the anchor plates and their firm anchorage insures the desired rigidity so that there is a minimum amount of give in the cot fastener.

While I have illustrated my invention as applied to a cot fastener of the hand operated type, it should be understood that it may be used also to advantage with automatic and semi-automatic types, as, for example, the solenoid operated type disclosed in Runkle Patent 2,076,866. With such a fastener it is obvious that a wall receptacle must be provided connected with the source of electric current supply and an attachment plug provided for entry in the receptacle and connected with the cot fastener, whereby to permit the connection and disconnection of the solenoid with the electrical control circuit at the same time that the cot fastener is mounted on the wall and removed therefrom.

It is believed the foregoing description conveys a good understanding of the objects and advantages of my invention. The appended claims have been drawn with a view to covering all legitimate modifications and adaptations.

I claim:

1. A detachable cot fastener bracket comprising a supporting anchor plate having a projecting internally threaded portion, means for securing the plate to a support, a cot fastener bracket comprising a main elongated hollow body portion having at its inner end an enlarged recessed base portion adapted to fit against and partially conceal said anchor plate while receiving the projecting internally threaded portion in the recess in the base portion to support the bracket on said anchor plate and having on the outside of its other end a flat vertical abutment face, and an elongated hand-screw extending freely through the hollow body portion in axial alignment with the internally threaded projecting portion of the anchor plate, one end of said screw being externally threaded and being adapted to thread in the internally threaded portion of the anchor plate, and the other end of said screw having an enlarged head thereon adapted for manual rotation of the screw in the threading thereof in the anchor plate and also adapted to engage said flat vertical abutment face on the bracket whereby to force the bracket toward the anchor plate in the tightening of said screw and prevent outward displacement of the bracket relative to the anchor plate, said bracket also comprising a cot fastener arm in transverse relation to said hollow body portion and extending outwardly beyond the plane of the aforesaid abutment face, said hand-screw being operable by means of the enlarged head thereon independently of said cot fastener arm.

2. A detachable cot fastener bracket comprising a supporting anchor plate having a projecting internally threaded portion, means for securing the plate to a support, a cot fastener bracket having a recessed base portion adapted to fit against and partially conceal said anchor plate while receiving the projecting internally threaded portion in the recess in the base portion to support the bracket on said anchor plate, an elongated hand-screw projecting freely through said bracket toward the internally threaded projecting portion of the anchor plate, one end of said screw being externally threaded and being adapted to thread in the internally threaded portion of the anchor plate, and the other end of said screw having an enlarged head thereon adapted for manual rotation of the screw in the threading thereof in the anchor plate and also adapted to engage an adjacent portion of the bracket whereby to force the bracket toward the anchor plate in the tightening of said screw and prevent outward displacement of the bracket relative to the anchor plate, one of the opposing faces on the anchor plate and base portion of the bracket having an annular recess provided therein in substantially concentric relation with the projecting internally threaded portion on the anchor plate, and a ring of compressible resilient material set in said recess and adapted to be compressed between the anchor plate and bracket in the tightening of the hand-screw.

3. In a cot fastener, the combination of two spaced substantially parallel cot fastener brackets each comprising a main elongated hollow body portion having at its inner end an enlarged base portion adapted to engage and be detachably secured to a support, the outer end of the body portion providing a flat vertical abutment face, each bracket also comprising a cot fastener arm in transverse relation to the hollow body portion and extending outwardly beyond the outer end of the body portion for support of an elongated cot fastener body in outwardly spaced relation to the flat vertical abutment faces on the outer ends of the body portions of said cot fastener brackets, an elongated cot fastener body supported on the outer ends of the cot fastener arms in transverse relation thereto, said body carrying means for detachably engaging a cot to be fastened, supporting means, and means for detachably securing each of said cot fastener brackets to said supporting means comprising an elongated hand screw extending freely through the hollow body portion of the associated bracket, one end of the screw being externally threaded to thread in an opening in the supporting means, and the other end of the screw having an enlarged head adapted to be used as a handle for manual rotation of the screw in threading the same and also adapted to engage the flat vertical abutment face on the bracket whereby to force the base portion of the bracket tightly against the supporting means.

DONALD H. COX.